United States Patent
Nishimoto et al.

(10) Patent No.: US 10,614,019 B2
(45) Date of Patent: Apr. 7, 2020

(54) METHOD AND SYSTEM FOR FAST ORDERED WRITES WITH TARGET COLLABORATION

(71) Applicant: EMC IP Holding Company LLC, Hopkinton, MA (US)

(72) Inventors: Michael Nishimoto, Saratoga, CA (US); Samir Rajadnya, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/581,707

(22) Filed: Apr. 28, 2017

(65) Prior Publication Data

US 2018/0314663 A1  Nov. 1, 2018

(51) Int. Cl.
*G06F 13/40* (2006.01)
*G06F 13/42* (2006.01)
*G06F 13/16* (2006.01)
*G06F 3/06* (2006.01)

(52) U.S. Cl.
CPC ........ *G06F 13/4068* (2013.01); *G06F 3/0604* (2013.01); *G06F 3/0659* (2013.01); *G06F 3/0683* (2013.01); *G06F 13/1642* (2013.01); *G06F 13/1673* (2013.01); *G06F 13/4282* (2013.01); *G06F 2213/0026* (2013.01)

(58) Field of Classification Search
CPC ............. G06F 13/4068; G06F 13/1642; G06F 13/1673; G06F 13/4282; G06F 2213/0026
See application file for complete search history.

(56) References Cited

U.S. PATENT DOCUMENTS

| | | |
|---|---|---|
| 5,708,668 A | 1/1998 | Styczinski |
| 6,351,838 B1 | 2/2002 | Amelia |
| 6,415,355 B1 | 7/2002 | Hirofuji |
| 7,398,418 B2 | 7/2008 | Soran et al. |
| 7,406,621 B2 | 7/2008 | Lubbers et al. |
| 7,430,706 B1 | 9/2008 | Yuan et al. |
| 7,543,100 B2 | 6/2009 | Singhal et al. |
| 7,644,197 B1 | 1/2010 | Waldorf et al. |

(Continued)

FOREIGN PATENT DOCUMENTS

| | | |
|---|---|---|
| CN | 101604267 A | 12/2009 |
| CN | 101980137 A | 2/2011 |

(Continued)

OTHER PUBLICATIONS

Decision to Grant a Patent issued in corresponding Japanese Application No. 2015-501902, dated May 31, 2016 (6 pages).

(Continued)

*Primary Examiner* — Tim T Vo
*Assistant Examiner* — Harry Z Wang
(74) *Attorney, Agent, or Firm* — Chamberlain, Hrdlicka, White, Williams & Aughtry (57) ABSTRACT

In general, embodiments of the technology relate to a method and system for performing fast ordered writes in a storage appliance that includes multiple separate storage modules. More specifically, embodiments of the technology enable multicasting of data to multiple storage modules in a storage appliance, where the order in which the write requests are processed is the same across all storage modules in the storage appliance.

16 Claims, 8 Drawing Sheets

(56) References Cited

U.S. PATENT DOCUMENTS

| | | |
|---|---|---|
| 7,752,389 B1 | 7/2010 | Fan |
| 7,934,120 B2 | 4/2011 | Zohar et al. |
| 8,078,906 B2 | 12/2011 | Yochai et al. |
| 8,145,840 B2 | 3/2012 | Koul et al. |
| 8,200,887 B2 | 6/2012 | Bennett |
| 8,234,445 B2 | 7/2012 | Chou et al. |
| 8,289,641 B1 | 10/2012 | Emami |
| 8,316,260 B1 | 11/2012 | Bonwick |
| 8,327,185 B1 | 12/2012 | Bonwick |
| 8,352,425 B2 | 1/2013 | Bourbonnais et al. |
| 8,448,021 B1 | 5/2013 | Bonwick |
| 8,464,095 B1 | 6/2013 | Bonwick |
| 8,489,979 B2 | 7/2013 | Rub |
| 8,554,997 B1 | 10/2013 | Bonwick et al. |
| 8,560,772 B1 | 10/2013 | Piszczek et al. |
| 8,719,520 B1 | 5/2014 | Piszczek et al. |
| 8,725,931 B1 | 5/2014 | Kang |
| 8,782,505 B2 | 7/2014 | Rub |
| 8,843,782 B2 | 9/2014 | Guan |
| 8,924,776 B1 | 12/2014 | Mollov et al. |
| 8,977,942 B2 | 3/2015 | Wu et al. |
| 9,021,183 B2 | 4/2015 | Matsuyama et al. |
| 9,152,499 B1 | 10/2015 | Mollov et al. |
| 9,529,674 B2 | 12/2016 | Pereira et al. |
| 9,552,242 B1 | 1/2017 | Leshinsky et al. |
| 9,760,493 B1 | 9/2017 | Wang |
| 10,095,414 B2 | 10/2018 | Zettsu et al. |
| 2002/0161972 A1 | 10/2002 | Talagala et al. |
| 2003/0093740 A1 | 5/2003 | Stojanovic |
| 2004/0153961 A1 | 8/2004 | Park et al. |
| 2004/0177219 A1 | 9/2004 | Meehan et al. |
| 2004/0225926 A1 | 11/2004 | Scales et al. |
| 2005/0166083 A1 | 7/2005 | Frey et al. |
| 2005/0223156 A1 | 10/2005 | Lubbers et al. |
| 2005/0229023 A1 | 10/2005 | Lubbers et al. |
| 2006/0085594 A1 | 4/2006 | Roberson et al. |
| 2006/0112261 A1* | 5/2006 | Yourst .............. G06F 9/3808 712/218 |
| 2006/0190243 A1 | 8/2006 | Barkai et al. |
| 2007/0061383 A1* | 3/2007 | Ozawa ............... G06F 11/2041 |
| 2008/0109602 A1 | 5/2008 | Ananthamurthy et al. |
| 2008/0120484 A1 | 5/2008 | Zhang et al. |
| 2008/0168225 A1 | 7/2008 | O'Connor |
| 2009/0187786 A1 | 7/2009 | Jones et al. |
| 2010/0005364 A1 | 1/2010 | Higurashi et al. |
| 2010/0082540 A1* | 4/2010 | Isaacson ............ G06F 11/1458 707/624 |
| 2010/0199125 A1 | 8/2010 | Reche |
| 2011/0055455 A1 | 3/2011 | Post et al. |
| 2011/0258347 A1* | 10/2011 | Moreira ................ G06F 9/467 710/6 |
| 2012/0030425 A1 | 2/2012 | Becker-Szendy et al. |
| 2012/0079318 A1 | 3/2012 | Colgrove et al. |
| 2012/0089778 A1 | 4/2012 | Au et al. |
| 2012/0166712 A1 | 6/2012 | Lary |
| 2012/0297118 A1 | 11/2012 | Gorobets et al. |
| 2012/0303576 A1* | 11/2012 | Calder ................ G06F 11/2076 707/611 |
| 2012/0324156 A1 | 12/2012 | Muralimanohar et al. |
| 2013/0151754 A1 | 6/2013 | Post et al. |
| 2013/0185735 A1 | 7/2013 | Farrell et al. |
| 2014/0359608 A1 | 12/2014 | Tsirkin et al. |
| 2015/0324387 A1 | 11/2015 | Squires |
| 2016/0132432 A1 | 5/2016 | Shen et al. |
| 2016/0148708 A1 | 5/2016 | Tuers et al. |
| 2016/0210060 A1 | 7/2016 | Dreyer |
| 2016/0239345 A1 | 8/2016 | Rachlin |
| 2016/0239421 A1 | 8/2016 | Abraham et al. |
| 2016/0320986 A1 | 11/2016 | Bonwick |
| 2017/0124327 A1 | 5/2017 | Kumbhar et al. |
| 2017/0192889 A1* | 7/2017 | Sato .................... G06F 12/0811 |
| 2017/0255405 A1 | 9/2017 | Zettsu et al. |
| 2017/0285945 A1 | 10/2017 | Kryvaltsevich |
| 2017/0300249 A1 | 10/2017 | Geml et al. |
| 2017/0329675 A1* | 11/2017 | Berger ................ G06F 11/1435 |
| 2017/0351604 A1 | 12/2017 | Tang et al. |
| 2018/0032333 A1 | 2/2018 | Sullivan |
| 2018/0150326 A1 | 5/2018 | Xia et al. |
| 2018/0267897 A1 | 9/2018 | Jeong |

FOREIGN PATENT DOCUMENTS

| | | |
|---|---|---|
| CN | 103019617 A | 4/2013 |
| CN | 103577111 A | 2/2014 |
| CN | 103902465 A | 7/2014 |
| CN | 104871138 A | 8/2015 |
| EP | 1577774 A2 | 9/2005 |
| JP | 2004-326759 A | 11/2004 |
| JP | 2010-508604 A | 3/2010 |
| WO | 2008/054760 A2 | 5/2008 |

OTHER PUBLICATIONS

Minoru Uehara; "Orthogonal RAID with Multiple Parties in Virtual Large-Scale Disks"; IPSJ SIG Technical Report; vol. 2011-DPS-149; No. 4; Nov. 24, 2011 (8 pages).

H. Peter Anvin; "The mathematics of RAID-6"; http://kernel.org/pub/linux/kernel/people/hpa/raid6.pdf (last visited Nov. 15, 2017) (9 pages).

Amber Huffman; "NVM Express: Revision 1.0b"; Jul. 12, 2011 (126 pages).

Akber Kazmi; "PCI Express™ Basics & Applications in Communication Systems"; PCI-SIG Developers Conference; 2004 (50 pages).

Derek Percival; "Multicast Over PCI Express®," PCI-SIG Developers Conference Europe; 2009 (33 pages).

Jack Regula; "Using Non-transparent Bridging in PCI Express Systems"; PLX Technology, Inc.; Jun. 1, 2004 (31 pages).

Definition: time slice: IBM knowledgebase, "Scheduler Processor Time Slice", retrieved on-line at http://www.ibm.com/support/knowledgecenter/en/ssw_aix_72/com.ibm.aix.performance/sched_proc_time_slice.htm, retrieved on Jun. 11, 2019 (2 pages).

Definition: time slice: Microsoft computer dictionary, Fifth Edition. p. 656, 2015 Safari Books Online, LLC., (1 page).

Definition: time slice: Wikipedia: retrieved on-line at https://en.wikipedia.org/wiki/Preemtion_(computing), on Jul. 11, 2019. (3 pages).

* cited by examiner

METHOD AND SYSTEM FOR FAST ORDERED WRITES WITH TARGET COLLABORATION

BACKGROUND

Storage appliances include storage media and provide a mechanism to enable clients to write data to and to read data from the storage media.

DETAILED DESCRIPTION

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-6, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to a method and system for performing fast ordered writes in a storage appliance that includes multiple separate storage modules. More specifically, embodiments of the technology enable multicasting of data to multiple storage modules in a storage appliance, where the order in which the write requests are processed is the same across all storage modules in the storage appliance. Embodiments of the technology enable the aforementioned ordering without requiring the clients to coordinate the writing of data to the storage appliance. In particular, embodiments of the technology enforce ordering of write requests using a fabric (e.g., a PCIe fabric) in combination with coordination between the storage modules (see e.g., FIGS. 4-5).

In one embodiment of the technology, the ordering is consistent across the storage modules such that the data stored in the individual storage modules (or a subset of the storage modules) is the same. For example, consider a scenario in which the storage appliance includes three storage modules (1, 2, 3). Further, assume that client A issues a first write request (A) specifying an object and offset and Client B issues a second write request (B) specifying the same object and offset. Embodiments of the technology ensure that the write requests (A, B) are processed in the same order on each of the storage modules such that after both write requests have been processed on the three storage modules (1, 2, 3), the data stored for the specific object and offset is the same on each of the three storage modules (1, 2, 3).

Figure 1A:
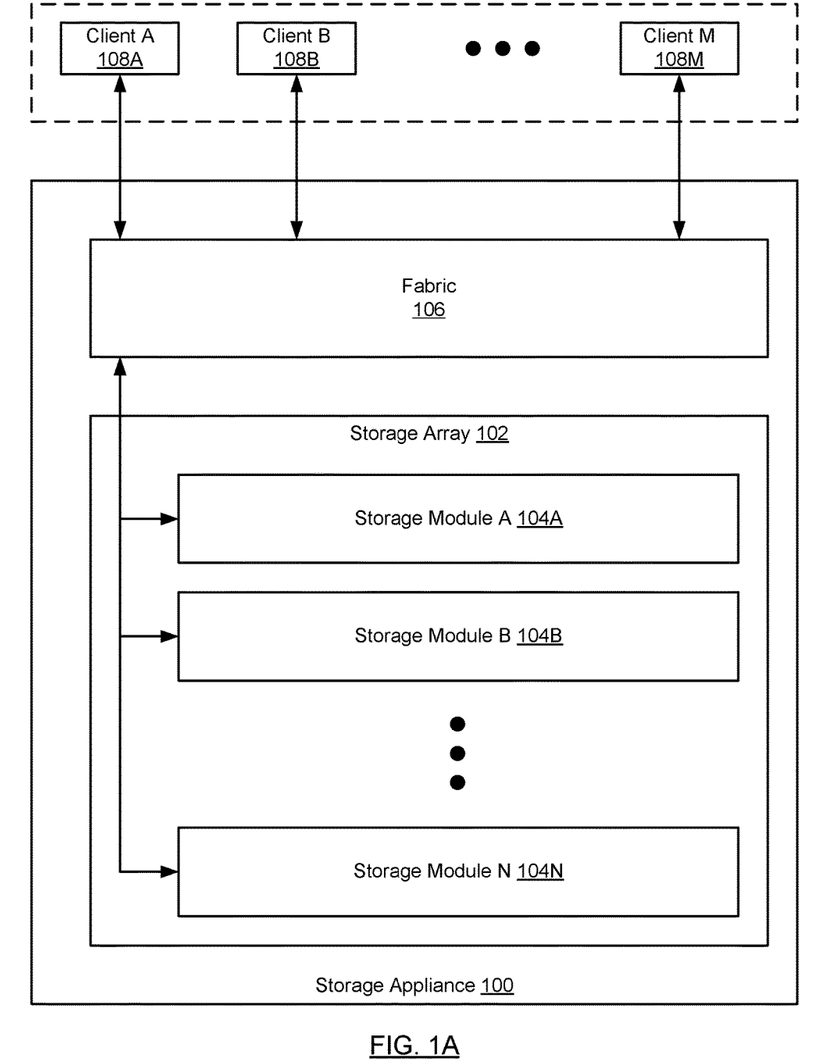
FIGS. 1A-1C show systems in accordance with one or more embodiments of the technology.

FIG. 1A shows a system in accordance with one or more embodiments of the technology. Referring to FIG. 1A, the system includes one or more clients (client A (108A)-client M (108M)) that are operatively connected to a storage appliance (100).

In one embodiment of the technology, the clients (108A-108M) may be any type of physical system that includes functionality to issue a read request to the storage appliance (100) and/or to issue a write request to the storage appliance (100). Though not shown in FIG. 1A, each of the clients (108A-108M) may include a client processor (not shown), client memory (not shown), and any other software and/or hardware necessary to implement one or more embodiments of the technology.

In one embodiment of the technology, the clients (108A-108M) are configured to execute an operating system (OS) that includes a file system. The file system provides a mechanism for the storage and retrieval of files from the storage appliance (100). More specifically, the file system includes functionality to perform the necessary actions to issue read requests and write requests to the storage appliance (100). The file system may also provide programming interfaces to enable the creation and deletion of files, reading and writing of files, performing seeks within a file, creating and deleting directories, managing directory contents, etc. In addition, the file system also provides management interfaces to create and delete file systems. In one embodiment of the technology, to access a file, the operating system (via the file system) typically provides file manipulation interfaces to open, close, read, and write the data within each file and/or to manipulate the corresponding metadata. In another embodiment of the technology, the client is configured to execute a block driver that is used to access the storage appliance. In another embodiment of the technology, the client is configured to execute an application programming interface (API) that enables the client to access the storage appliance.

In one embodiment of the technology, the clients (108A-108M) interface with the fabric (106) of the storage appliance (100) to communicate with the storage appliance (100), as further described below in FIG. 2.

In one embodiment of the technology, the storage appliance (100) is a system that includes persistent storage, and is configured to service read requests and/or write requests from one or more clients (108A-108M).

The storage appliance (100), in accordance with one or more embodiments of the technology, includes one or more storage modules (104A-104N) organized in a storage array (102) and a fabric (106) that interfaces the storage module(s) (104A-104N) with the clients (108A-108M). Each of these components is described below.

The storage array (106), in accordance with an embodiment of the technology, accommodates one or more storage modules (104A-104N). The storage array may enable a modular configuration of the storage appliance, where storage modules may be added to or removed from the storage appliance (100), as needed or desired. A storage module (104), in accordance with an embodiment of the technology, is described below, with reference to FIG. 1C.

Continuing with the discussion of the storage appliance (100), the storage appliance includes the fabric (106). The fabric (106) may provide physical connectivity between the clients (108A-108M) and the storage module(s) (104A-104N) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the technology is not limited to the aforementioned protocols. A fabric (106) in accordance with an embodiment of the technology, is described below, with reference to FIG. 1B.

Figure 1B:
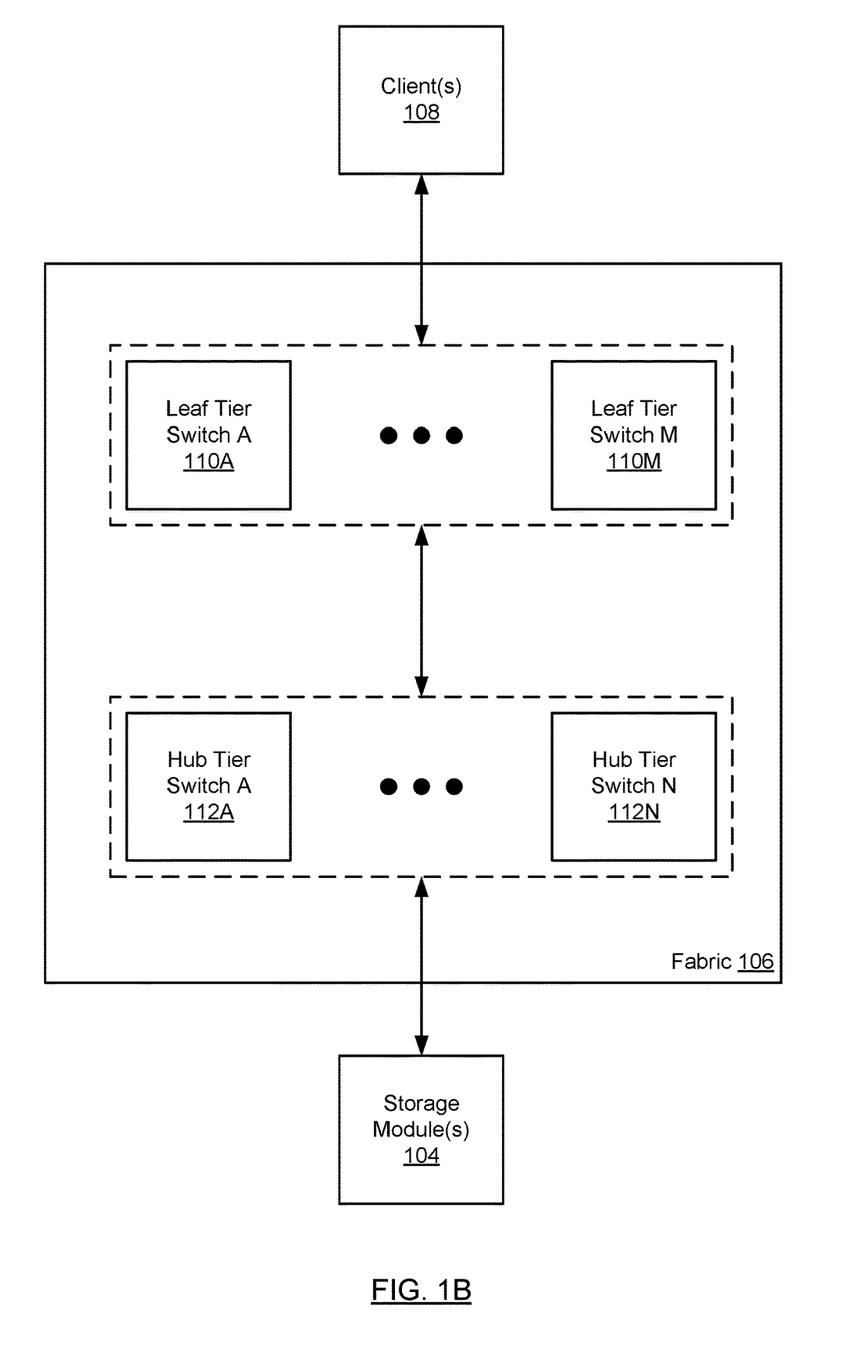

FIG. 1B shows a fabric in accordance with one or more embodiments of the technology. The fabric (106) includes one or more leaf tier switches (110A, 110M) and one or more hub tier switches (112A, 112N). Each of these components is described below.

With respect to the leaf tier switches (110A, 110M), each leaf tier switch is a physical PCIe switch that is connected to one or more clients (108) and each client (108) may be connected to one or more leaf tier switches. Each leaf tier switch is also connected to one or more hub tier switches. In one embodiment of the technology, each leaf tier switch is connected to every hub tier switch in the fabric resulting in a fully connected mesh between the tiers in the fabric. Embodiments of the technology may be implemented without a fully connected mesh between the tiers without departing from the technology.

In one embodiment of the technology, each leaf tier switch is configured to: (i) receive transaction layer packets (TLPs) from the clients with which it is connected and route the TLPs to the appropriate hub tier switch using address routing and (ii) receive TLPs from one or more hub tier switches to which the leaf tier switch is connected and route the TLPs to the appropriate client using address routing.

With respect to the hub tier switches (112A-112N), each hub tier switch is a physical PCIe switch that is connected to one or more leaf tier switches (110A-110M) and to one or more storage modules (104). Further, each storage module may be connected to one or more hub tier switches. In one embodiment of the technology, each hub tier switch is connected to every other leaf tier switch in the fabric resulting in a fully connected mesh between the tiers in the fabric. Embodiments of the technology may be implemented without a fully-connected mesh between the tiers without departing from the technology.

In one embodiment of the technology, each hub tier switch is configured to: (i) receive TLPs from the storage modules (104) with which it is connected and route the TLPs to the appropriate leaf tier switch using address routing and (ii) receive TLPs from one or more leaf tier switches to which the hub tier switch is connected and route the TLPs to the appropriate storage modules (104) using address routing.

In addition, one or more hub tier switches are configured to generate multiple TLPs in response to receiving a single TLP from a leaf tier switch. For example, a client (108) may generate and send a TLP that includes a multicast address to a leaf tier switch. The leaf tier switch evaluates the multicast address and routes, based on the evaluation, the TLP to a hub tier switch. The hub tier switch subsequently receives the TLP and evaluates the address, which based on the evaluation, is identified as a multicast address. Based on the evaluation, N number of TLPs are generated. Each of the N number of TLPs is then transmitted to a different storage module.

In one embodiment of the technology, the fabric may concurrently receive TLPs from multiple clients. However, the fabric serializes the transmission of TLPs to the storage modules. More specifically, in one embodiment of the technology, each hub tier switch serializes the processing of TLPs it receives from the various clients. As a result, the hub tier switch also serializes the transmission of TLPs to the storage modules. In this manner, hub tier switch ensures that the TLPs it issues to each storage module are issued in the same order.

Figure 3:
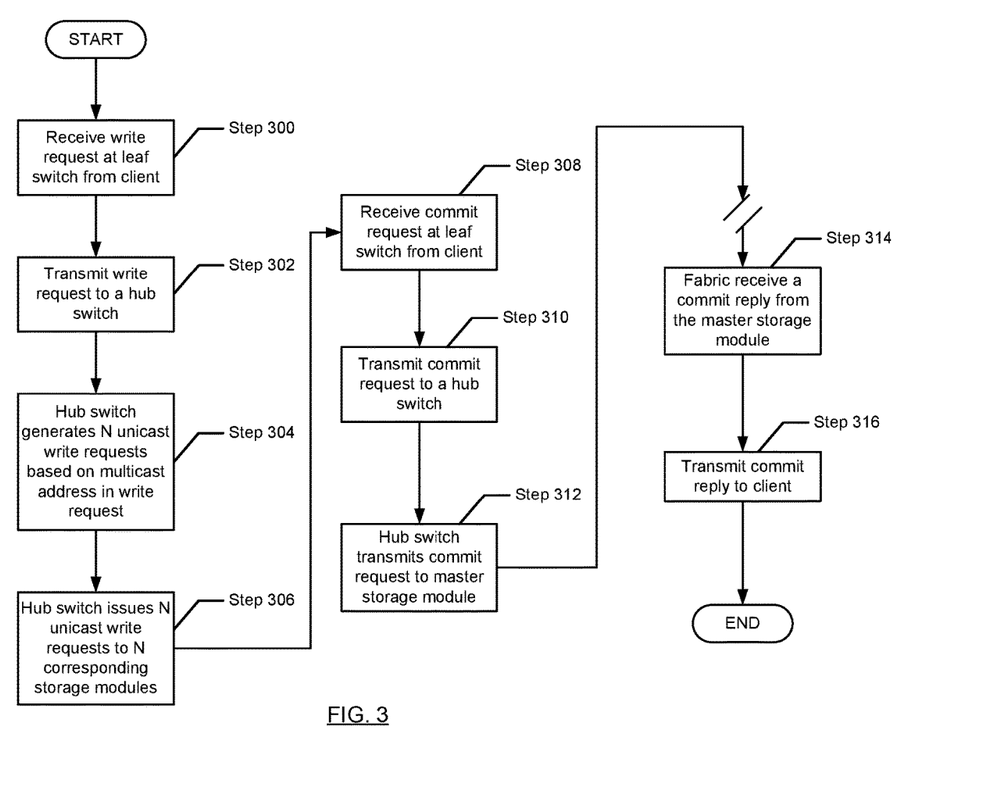
Figure 4:
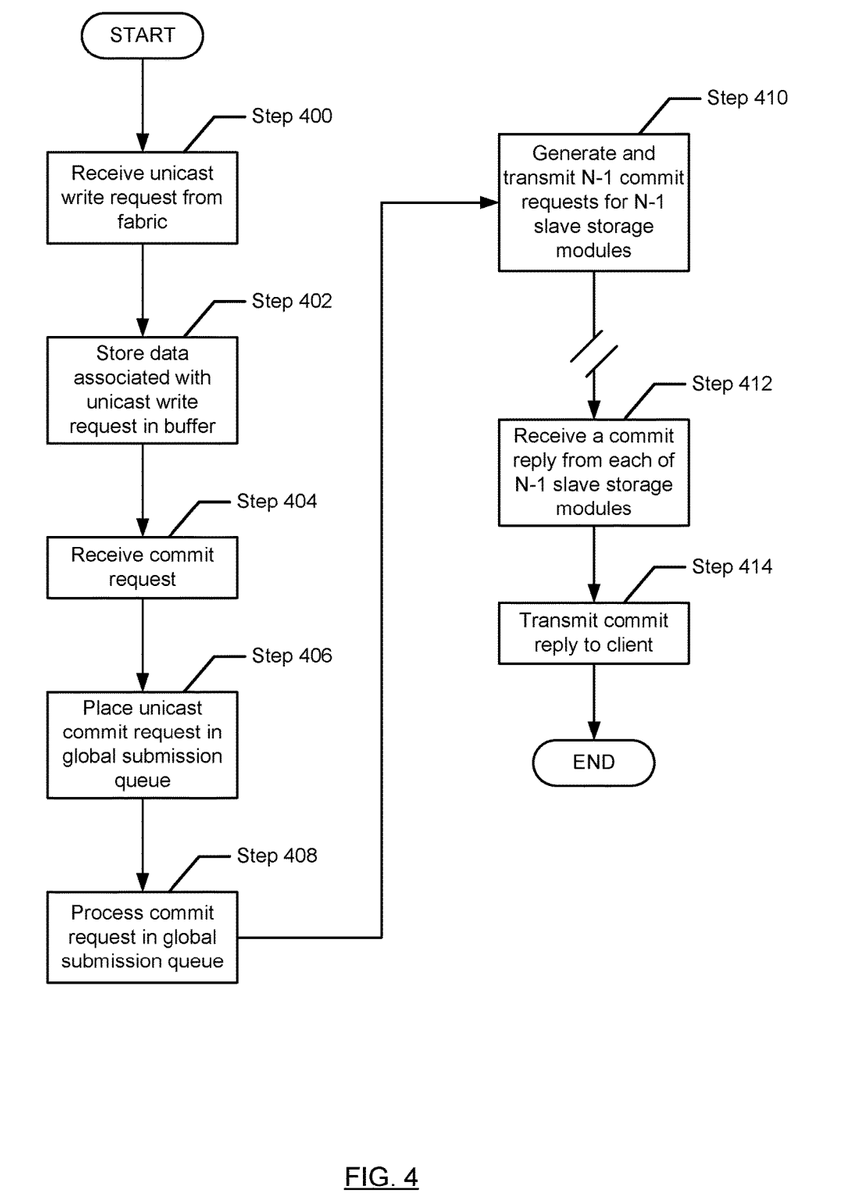
Figure 5:
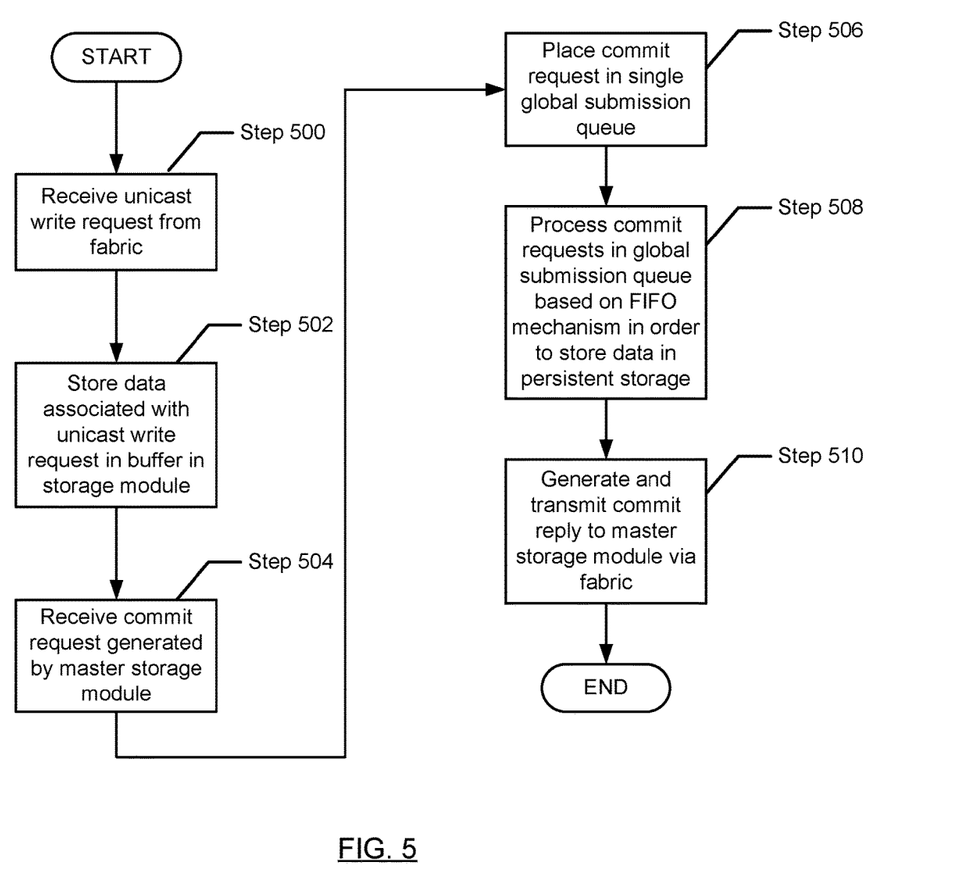

In one embodiment of the technology, the fabric is configured to perform all or a portion of the methods shown in FIGS. 3-5.

Figure 1C:
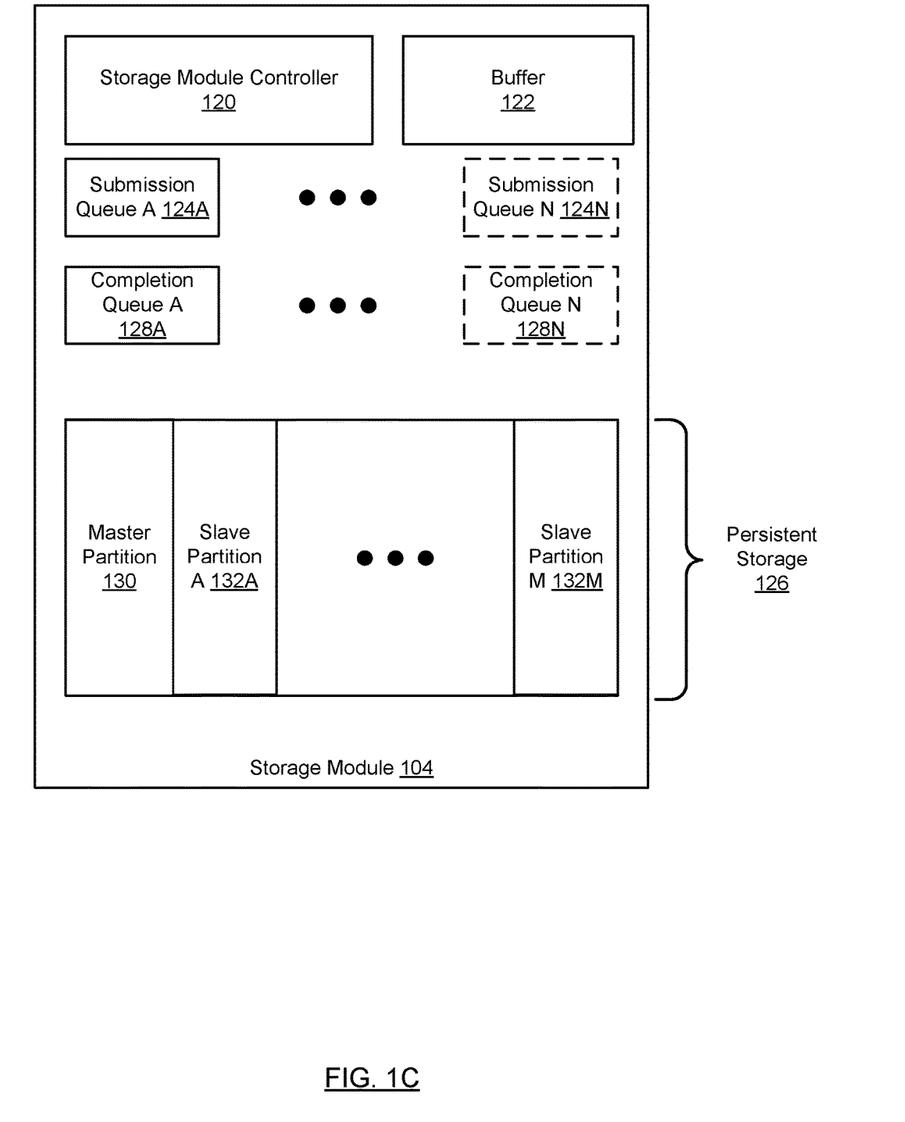

FIG. 1C shows a storage module (104), in accordance with one or more embodiments of the technology. The storage module (104) includes a storage module controller (120), a buffer (122), one or more submission queues (124A, 104N), one or more completion queues (128A, 128N), and persistent storage (126). Each of these components is described below.

In one embodiment of the technology, the storage module controller (120) is configured to receive and service requests to read from and/or write data to the persistent storage (122). These requests may originate from the clients (108) and may be conveyed to the storage module controller (120) via the fabric (106). Further, the storage module controller (124) may be programmed to, or otherwise configured to, perform all or a portion of the methods shown in FIGS. 4 and 5.

In one embodiment of the technology, the storage module controller (120) includes a processor (not shown) (e.g., one or more cores, or micro-cores of a processor that are configured to execute instructions), one or more hardware registers (not shown), and memory (shown) (e.g., volatile memory that may be, but is not limited to, dynamic random-access memory (DRAM), synchronous DRAM, SDR SDRAM, and DDR SDRAM) to perform all or a portion of the method described in FIGS. 4 and 5. Alternatively, the storage module controller (120) may be implemented using a field-programmable gate array (FPGA) and/or an application-specific integrated circuit (ASIC).

In one embodiment of the technology, the persistent storage (126) of the storage module (104) may include, but is not limited to, Spin-Torque Magnetic RAM (ST-MRAM), Phase Change Memory (PCM), NAND Flash memory and NOR Flash memory. Those skilled in the art will appreciate that the technology is not limited to aforementioned types of persistent storage.

In one embodiment of the technology, the persistent storage stores data as objects. Accordingly, data may be written to and/or read from the objects by specifying an object identifier (ID) and an offset (i.e., an offset within the object).

The persistent storage may be logically divided into a master partition (130) and one or more slave partitions (132A, 132M). The number of slave partitions corresponds to the number of other storage modules on which a copy of data is to be stored. For example, consider a scenario in which there are three storage modules (SM 1, SM 2, SM 3) and a copy of the data is to be stored on each of the storage modules. In this example, one copy of the data may be stored in the master partition of SM 1, a second copy of the data may be stored in a slave partition of SM 2, and a third copy of the data may be stored in a slave partition of SM 3. In one embodiment of the technology, the storage modules maintain address mappings between address in a master partition and one or more addresses in the corresponding slave partitions (which are located on other storage modules).

Those skilled in the art will appreciate that while the persistent storage is logically partitioned (as described above), from the perspective of the clients (FIG. 1, 108), the persistent storage appears as single unified address space. Said another way, the partitioning of the persistent storage is performed in a manner that is transparent to the clients.

In one embodiment of the technology, the buffer (122) is volatile memory that temporarily stores data received by the storage module prior to the data being stored in the persistent storage.

In one embodiment of the technology, the storage module may include one or more submission queues (124A, 124N). The submission queues store commit requests in the order in which they are received by the storage module. In one embodiment of the technology, the storage module includes a single global submission queue in which all commit requests received from all clients are stored. In another embodiment of the technology, the storage module includes a set of submission queues, where each submission queue only stores commit requests received from a specific client and/or from a specific master storage module (see e.g., FIGS. 5 and 6).

In one embodiment of the technology, the storage module may include one or more completion queues (128A, 128N). The completion queues store commit replies received by the storage module from other storage module (see e.g., FIGS. 4-6). In one embodiment of the technology, the storage module includes a single global completion queue in which all commit replies received from all storage modules are stored. In another embodiment of the technology, the storage module includes a set of completion queues, where each completion queue only stores commit replies received from a specific storage module.

One skilled in the art will recognize that the architecture of the system is not limited to the components shown in FIGS. 1A-1C. For example, the components of the storage appliance (100) may include any number of storage modules (104A-104N). Further, the storage module controller (120) of the storage module (104) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

FIGS. 2-5 show flowcharts in accordance with one or more embodiments of the technology. While the various steps in the flowchart are presented and described sequentially, one of ordinary skill in the art will appreciate that some or all of the steps may be executed in different orders, may be combined or omitted, and some or all of the steps may be executed in parallel. In one embodiment of the technology, each of the steps shown in FIGS. 2-5 may be performed in parallel with any of the other steps shown in FIGS. 2-5.

Figure 2:
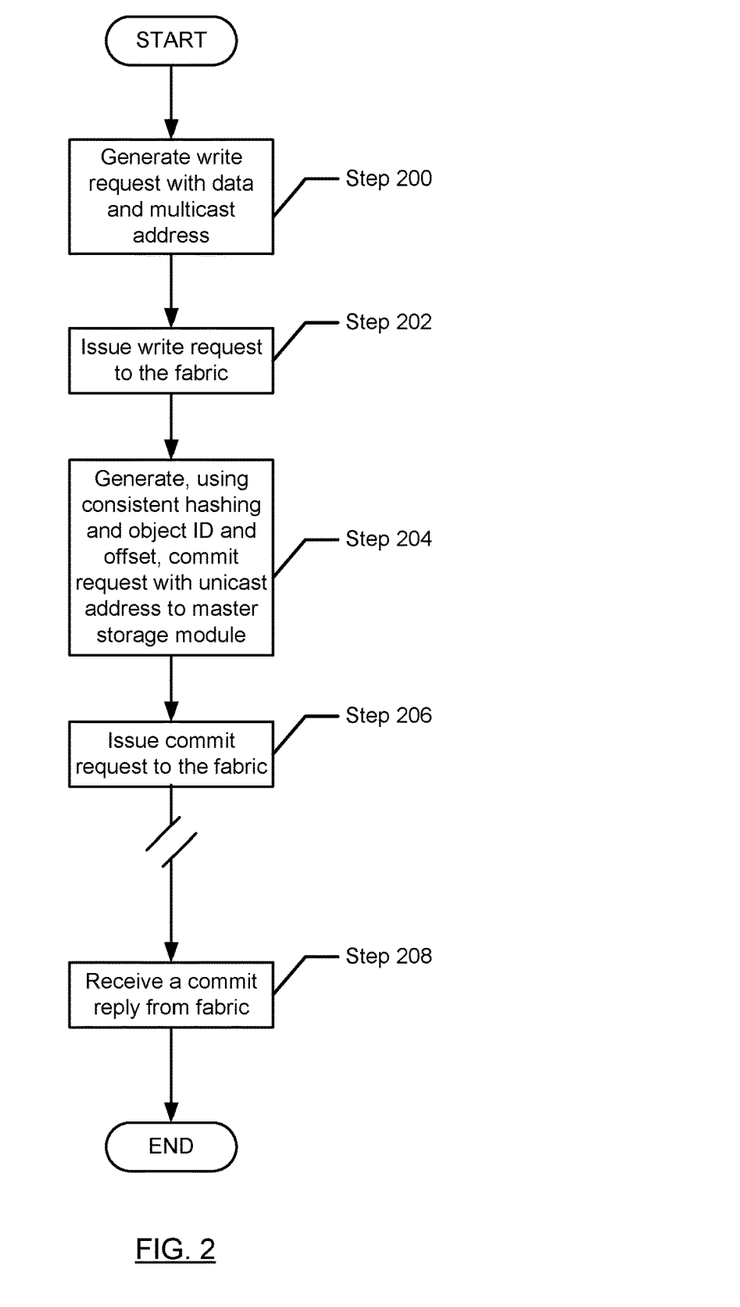
FIGS. 2-5 show flowcharts in accordance with one or more embodiments of the technology.

FIG. 2 shows a method for writing data to the storage modules from the perspective of a client in accordance with one or more embodiments of the technology.

In Step 200, a client generates a write request that includes an address and data. The address included in the write request may be a multicast address. More specifically, the address may appear, from the perspective of the client, as any other address; however, when this address is evaluated by the fabric, it results in the generation of N number of write requests (see e.g., FIG. 3, step 304).

In Step 202, the write request is issued by the client to the fabric. If the fabric is a PCIe fabric (i.e., a fabric that implements PCIe), then the write request may be issued using one or more TLPs.

In Step 204, the client generates a commit request which includes an address. While the write request includes the data to be transmitted, the commit request includes the command which results in the data being stored in the persistent storage (see e.g., FIGS. 4, 5). In one embodiment of the technology, the client uses a consistent hashing function with the object identifier and offset as inputs to determine an address to use for the commit request. More specifically, commit requests for a specific object (identified using the object identifier) and offset are always sent to the same storage module (i.e., the "master storage module) for the <object ID, offset>). In one embodiment of the invention, the consistent hashing function is used to identify the master storage module. Further, because each client implements the same consistent hashing function, all commit requests for a specific <object ID, offset> as sent to the same storage module (i.e., the "master storage module) for the <object ID, offset> regardless of which client generates the commit request.

In one embodiment of the technology, the commit request is sent to one of the storage modules that received the data via the write request. For example, consider a scenario in which there are three storage modules (SM 1, SM 2, SM 3) and a copy of the data is to be stored on each of the storage modules for <object ID 1, offset 3>. In this scenario, a multicast address associated with a multicast group (i.e., SM 1, SM 2, SM 3) is used in the write request to transmit data to the individual storage modules. Further, a consistent hashing function is used in combination with <object ID 1, offset 3> as inputs to identify SM 2 as the master storage module for <object ID 1, offset 3>. Accordingly, the commit request is transmitted to SM 2.

Continuing with the discussion of FIG. 2, in Step 206, the commit request is issued by the client to the fabric. If the fabric is a PCIe fabric (i.e., a fabric that implements PCIe), then the commit request may be issued using one or more TLPs.

At some later point in time, in Step 208, the client receives a commit reply from the fabric which originated from the storage module that received the commit request issued in Step 206 (assuming that the commit request was successfully processed and the fabric remains operational).

FIG. 3 shows a method for writing data to the storage modules from the perspective of the fabric in accordance with one or more embodiments of the technology.

In Step 300, a write request that includes data and a multicast address is received by a leaf switch in the fabric. If the fabric is a PCIe fabric, then the write request may be received as one or a set of TLPs.

In Step 302, the leaf switch processes the write request. More specifically, the processing of the write request includes evaluating the address in the write request to identify a hub tier switch (or an egress port operatively connected to the hub tier switch). The result of the processing is the transmission of the write request to a hub tier switch. In one embodiment of the technology, a specific hub tier switch processes all write requests for a given address. For example, all write requests received by the fabric that include address A are routed to hub tier switch A.

In Step 304, in response to receiving the write request, the hub tier switch processes the write request. The processing of the write request includes determining that the address in the write request is a multicast address and, in response to this determination, generating N number of write requests. The specific number (N) of write requests generated is pre-configured on the hub tier switch. In one embodiment of the technology, each of the generated write requests includes a unicast address.

In Step 306, the generated write requests (i.e., the write requests generated in step 304) are transmitted to the storage modules. More specifically, each of the N write requests is transmitted to one of N storage modules in the storage appliance.

In Step 308, a commit request corresponding to the write request (received in step 300) is received by a leaf switch in the fabric. If the fabric is a PCIe fabric, then the commit request may be received as one or a series of TLPs.

In Step 310, the leaf switch processes the commit request. The result of the processing is the transmission of the commit request to a hub tier switch that is connected to the master storage module.

In Step 312, in response to receiving the commit request, the hub tier switch processes the commit request. The result of the processing is the transmission of the commit request to master storage module (i.e., the master storage module for the <object ID, offset>).

At some later point in time, in Step 314, the fabric receives a commit reply from the master storage module. In step 316, the fabric transmits the commit reply to the client (assuming that fabric remains operational).

FIG. 4 shows a method for writing data to the storage modules from the perspective of a master storage module with a single global submission queue in accordance with one or more embodiments of the technology.

In Step 400, a unicast write request is received from the fabric (i.e., a write request issued by the fabric in Step 306).

In Step 402, the data associated with the write request is stored in a buffer of the "master" storage module.

In Step 404, a unicast commit request is received from the fabric (i.e., a commit request issued by the fabric in Step 312).

In Step 406, the unicast commit request is placed in the single global submission queue. In one embodiment of the technology, the commit request includes, or is otherwise associated with, a client identifier. The client identifier is used in the generation and/or processing of the corresponding commit reply (see e.g., FIG. 4, step 414).

In Step 408, the commit request in the global submission queue is processed based on a first-in first-out mechanism in order to preserve the processing order. The result of processing a commit request is the storing of data in a location in a master partition in the persistent storage. Said another way, the order in which the data is written to the persistent storage is dictated by the order in which the commit requests are processed and not by the order in which the write requests (and/or data) is received by the storage module.

In Step 410, N−1 commit requests are generated by the master storage module and transmitted, via the fabric, to N−1 slave storage modules. For example, consider a scenario in which there are three storage modules (SM 1, SM 2, SM 3) and a copy of the data is to be stored on each of the storage modules for <object ID 1, offset 3>. Further, assume that SM 1 is the master storage module for <object ID 1, offset 3>. In this scenario, SM 1 generates two commit requests—one to be sent to SM 2 and another to be sent to SM 3. In one embodiment of the technology, the storing of the data in the master partition of the persistent storage in step 408 may be performed in parallel with step 410.

In Step 412, N−1 commit replies are received from the slave storage modules, via the fabric, and stored in a global completion queue on the master storage module. Continuing with the example, from Step 410, SM 1 (which is the master storage module in the example) would receive one commit reply from SM 2 and one commit reply from SM 3 (assuming that the commit replies were successful processed). Those skilled in the art will appreciate that in certain scenarios one or more commit replies may be received by the master storage module prior to all commit requests being transmitted to the slave storage modules. For example, the master storage module transmit a commit request to slave storage module 1 and receive a corresponding commit reply from slave storage module 1 prior to sending a commit request to slave storage module 2.

Continuing with the discussion of FIG. 4, in Step 414, a commit reply is generated and sent to the fabric by the master storage module. In one embodiment of the technology, the commit reply is generated based, as least in part, on the client identifier associated with the corresponding commit request (i.e., the commit request received in step 404). A commit reply may only be generated by the master storage module if N−1 commit replies are received from the N−1 slave storage modules and the commit request in Step 408 was successfully processed by the master storage module.

FIG. 5 shows a method for writing data to the storage modules from the perspective of a slave storage module with a single global submission queue in accordance with one or more embodiments of the technology.

In Step 500, a unicast write request is received from the fabric (i.e., a write request issued by the fabric in Step 306).

In Step 502, the data associated with the write request is stored in a buffer of the storage module.

In Step 504, a unicast commit request is received from the fabric (i.e., a commit request issued by the master storage module in Step 410).

In Step 506, the unicast commit request is placed in the single global submission queue. In one embodiment of the technology, the commit request includes or is otherwise associated with a client identifier. The client identifier is used in the generation and/or processing of the corresponding commit reply (see e.g., FIG. 5, step 510).

In Step 508, the commit requests in the global submission queue are processed based on a first-in first-out mechanism in order to preserve the processing order. Said another way, the order in which the data is written to the persistent storage is dictated by the order in which the commit requests are processed and not by the order in which the write requests (and/or data) is received by the storage module.

The result of processing a commit request is the storing of data in the persistent storage. More specifically, consider a scenario in which a slave storage module received write request 1 (WR1) and subsequently commit request 1 (CR1) from a master storage module. The result of processing CR1 is that data associated with WR1 is copied from a buffer in the storage module to a location in a corresponding slave partition in the persistent storage in the storage module.

In Step 510, a commit reply corresponding to the commit request received in step 504 is generated and sent to the master storage module via the fabric. In one embodiment of the technology, the commit reply is generated based, as least in part, on the client identifier associated with the corresponding commit request.

In one embodiment of the technology, steps 500-506 are performed in parallel with steps 508-510. Specifically, steps 500-506 result in the population of the global submission queue while steps 508-510 result in the processing of commit requests in the global submission queue. Those skilled in the art will appreciate that the method shown in FIG. 5 may be performed in parallel for each <object ID, offset>.

With respect to the processing of commit requests in global submission queues in FIGS. 4 and 5, those skilled in the art will appreciate that the global submission queue for any storage module may include commit requests originating from one or more clients as well as commit requests originating from one or more master storage modules. In scenarios in which the commit request is from a client, the processing of the commit request is performed in accordance with FIG. 4 while the processing of the commit request is performed in accordance with FIG. 5 if the commit request is received from a master storage module.

Further, while FIGS. 4 and 5 have been described with respect to using a single global submission queue in the master storage module and a single global submission queue in each of the slave storage modules, embodiments of the technology may be implemented using: (i) a set of submission queues and (ii) a set of completion queues. The set submission queues may include a per-client submission queue for each client and a per-master storage module submission queue for each master storage module from which commit requests are received. Further, the set of completion queues may include a per-slave storage module completion queue for each slave storage module from which commit replies are received.

In such embodiments of the technology, each commit request includes, or is otherwise associated with, a global sequencing tag. The global sequencing tags are used to maintain a global processing order of commit requests received by the storage module. The global sequencing tag may be added to (or otherwise associated with) the commit request by a storage module controller. Further, the commit requests in the per-client submission queues are processed based on the global sequencing tags in order to preserve the global processing order in the storage module.

The skilled in that art will appreciate that the submission queues and/or completion queues may be organized using other schemes without departing from the technology.

Figure 6:
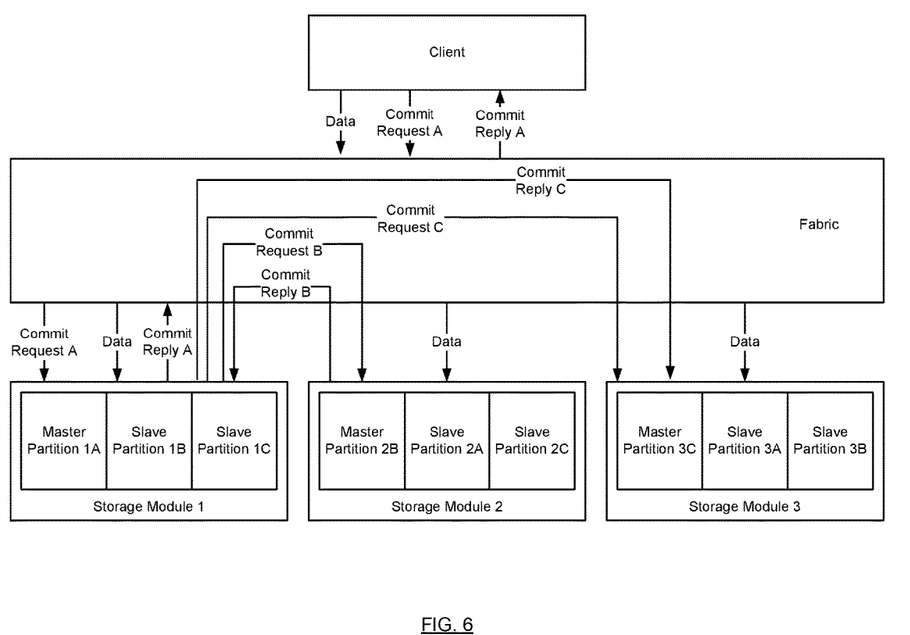
FIG. 6 shows an example system in accordance with one or more embodiments of the technology.

FIG. 6 shows an example system in accordance with one or more embodiments of the technology. The example is not intended to limit the scope of the technology.

Turning to the example, consider a scenario in which a client wants to store three copies of data in a storage appliance. In order to store the three copies of data in the storage appliance, the client issues a write request with a multicast address and data and transmits that request to the fabric. The fabric, in response to receiving the write request generates and issues three write requests. This results in one copy of the data being stored in a buffer (not shown) in each of the storage modules (storage module 1, storage module 2, storage module 3).

The client subsequently generates a commit request (commit request A). In this example, assume data is being written to <object 5, offset 3> and the master storage module (as determined using a consistent hashing function) is storage module 1. Accordingly, the commit request is transmitted, via the fabric, to storage module 1.

In response to receiving commit request A, storage module 1 stores commit request A in a submission queue (not shown) in storage module 1. Commit request A is subsequently processed by storage module 1 resulting in a copy of the data (currently in the buffer in storage module 1) being stored in a location in master partition 1A of the persistent storage in storage module 1. Storage module 1 also generates two commit requests (commit request B, and commit request C). Storage module 1 then sends, via the fabric, commit request B to storage module 2 and commit request C to storage module 3. As discussed above, the processing of commit request A may be performed in parallel with the generation and transmission of commit request B and commit request C.

In response to receiving commit request B, storage module 2 stores commit request B in a submission queue (not shown) in storage module 2. Commit request B is subsequently processed by storage module 2 resulting in a copy of the data (currently in the buffer in storage module 2) being stored in a location in slave partition 2A of the persistent storage in storage module 2. After commit request B has been processed, storage module 2 generates and transmits, via the fabric, commit reply B to storage module 1.

In response to receiving commit request C, storage module 3 stores commit request C in a submission queue (not shown) in storage module 3. Commit request C is subsequently processed by storage module 3 resulting in a copy of the data (currently in the buffer in storage module 3) being stored in a location in slave partition 3A of the persistent storage in storage module 3. After commit request C has been processed, storage module 3 generates and transmits, via the fabric, commit reply C to storage module 1.

Returning to storage module 1, storage module 1 receives and stores commit reply B and commit reply C in a completion queue. Once commit request A has been processed and commit replies B and C have been received, storage module A generates and transmits, via the fabric, commit reply A to the client.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for processing write requests comprising:
receiving, by a first storage module, a first commit request from a client, wherein the first commit request is associated with a first data and comprises an address, wherein the address is generated by applying a consistent hashing function to at least an object identifier and an offset associated with the first data, wherein the address is associated with the first storage module;
in response to receiving the first commit request:
processing the first commit request, wherein processing the first commit request causes a first copy of the first data to be stored in persistent storage in the first storage module, wherein the first copy of the first data was received from the client and by the first storage module prior to the first storage module receiving the first commit request;

generating, by the first storage module, a second commit request for a second storage module;

transmitting the second commit request to the second storage module;

receiving a first commit reply from the second storage module indicating that a second copy of the first data is stored in persistent storage in the second storage module, wherein the second copy of the first data was received from the client and by the second storage module prior to the first storage module receiving the first commit request;

in response to receiving the first commit reply and after processing the first commit request, generating, by the first storage module, a second commit reply corresponding to the first commit request; and transmitting the second commit reply to the client.

2. The method of claim 1, further comprising:

receiving a third commit request by the first storage module from the second storage module, wherein the third commit request is associated with a second data; and processing the third commit request, wherein processing the third commit request causes a first copy of the second data to be stored in a slave partition of the persistent storage in the first storage module, wherein the slave partition is associated with a master partition on the second storage module.

3. The method of claim 2, further comprising:

prior to receiving the second commit request:

receiving a second copy of the second data from the client; and temporarily storing the second copy of the second data in a buffer in the first storage module.

4. The method of claim 1, wherein processing the first commit request comprises:

storing the first commit request in a global submission queue, wherein the global submission queue maintains an order of all commit requests received by the first storage module, wherein the first commit request is processed based on the order.

5. The method of claim 1, wherein processing the first commit request comprises:

storing the first commit request in a client submission queue associated with the client, wherein the first commit request is associated with a global sequencing tag, wherein the first commit request is processed based on an order specified by the global sequencing tag.

6. The method of claim 1, wherein the first commit request is received from the client from a fabric operatively connected to the client and the first storage module.

7. The method of claim 6, wherein the second commit request is transmitted to the second storage module using the fabric.

8. The method of claim 6, wherein the fabric is a Peripheral Component Interconnect Express (PCIe) fabric.

9. The method of claim 1, wherein the persistent storage in the first storage module comprises phase change memory.

10. A storage appliance, comprising:

a fabric;

a storage array operatively connected to the fabric and comprising a first storage module and a second storage module, wherein the first storage module is configured to:

receive, via the fabric, a first commit request from a client, wherein the first commit request is associated with a first data and comprises an address, wherein the address is generated by applying a consistent hashing function to at least an object identifier and an offset associated with the first data, wherein the address is associated with the first storage module;

in response to receiving the first commit request:

process the first commit request, wherein processing the first commit request causes a first copy of the first data to be stored in persistent storage in the first storage module, wherein the first copy of the first data was received from the client and by the first storage module prior to the first storage module receiving the first commit request;

generate a second commit request for a second storage module;

transmit, via the fabric, the second commit request to the second storage module;

receive, via the fabric, a first commit reply from the second storage module indicating that a second copy of the first data is stored in persistent storage in the second storage module, wherein the second copy of the first data was received from the client and by the second storage module prior to the first storage module receiving the first commit request;

in response to receiving the first commit reply and after processing the first commit request, generate a second commit reply corresponding to the first commit request; and transmit, via the fabric, the second commit reply to the client.

11. The storage appliance of claim 10, wherein the first storage module is further configured to:

receive a third commit request from the second storage module, wherein the third commit request is associated with a second data; and process the third commit request, wherein processing the third commit request causes a first copy of the second data to be stored in a slave partition of the persistent storage in the first storage module, wherein the slave partition is associated with a master partition on the second storage module.

12. The storage appliance of claim 11, wherein the first storage module is further configured to:

prior to receiving the third commit request:

receive a second copy of the second data from the client; and temporarily store the second copy of the second data in a buffer in the first storage module.

13. The storage appliance of claim 10, wherein processing the first commit request comprises:

storing the first commit request in a global submission queue, wherein the global submission queue maintains an order of all commit requests received by the first storage module, wherein the first commit request is processed based on the order.

14. The storage appliance of claim 10, wherein processing the first commit request comprises:

storing the first commit request in a client submission queue associated with the client, wherein the first commit request is associated with a global sequencing tag, wherein the first commit request is processed based on an order specified by the global sequencing tag.

15. The storage appliance of claim 10, wherein the fabric is a Peripheral Component Interconnect Express (PCIe) fabric.

16. The storage appliance of claim 10, wherein the persistent storage in the first storage module comprises phase change memory.

\* \* \* \* \*